US012619045B2

(12) United States Patent
Mitobe et al.

(10) Patent No.: US 12,619,045 B2
(45) Date of Patent: May 5, 2026

(54) EFFICIENT ALIGNMENT STRUCTURE FOR MULTIPLE CONNECTORS BRANCHING FROM A SINGLE OPTICAL CABLE

(71) Applicant: FUJIKURA LTD., Tokyo (JP)

(72) Inventors: Ryoichi Mitobe, Sakura (JP); Kansei Shindo, Sakura (JP)

(73) Assignee: Fujikura Ltd., Tokyo (JP)

( * ) Notice: Subject to any disclaimer, the term of this patent is extended or adjusted under 35 U.S.C. 154(b) by 195 days.

(21) Appl. No.: 17/802,703

(22) PCT Filed: Feb. 15, 2021

(86) PCT No.: PCT/JP2021/005535
§ 371 (c)(1),
(2) Date: Aug. 26, 2022

(87) PCT Pub. No.: WO2021/199736
PCT Pub. Date: Oct. 7, 2021

(65) Prior Publication Data
US 2023/0141383 A1　May 11, 2023

(30) Foreign Application Priority Data

Apr. 2, 2020　(JP) ................................. 2020-066744

(51) Int. Cl.
*G02B 6/54*　(2006.01)
*G02B 6/44*　(2006.01)

(52) U.S. Cl.
CPC .......... *G02B 6/545* (2023.05); *G02B 6/44528* (2023.05)

(58) Field of Classification Search
CPC ...... G02B 6/4401; G02B 6/46; G02B 6/4411; G02B 6/4432; G02B 6/44528; G02B 6/545; G02B 6/4472
See application file for complete search history.

(56) References Cited

U.S. PATENT DOCUMENTS 5,210,810 A * 5/1993 Darden .................. G02B 6/383
385/78
5,231,688 A * 7/1993 Zimmer ............... G02B 6/4471
385/139

(Continued)

FOREIGN PATENT DOCUMENTS

JP　　S62134606 A　　6/1987
JP　　102073202 A　　3/1990
JP　　2010217316 A　　9/2010

OTHER PUBLICATIONS

International Search Report issued in corresponding International Application No. PCT/JP2021/005535, mailed Apr. 27, 2021, with translation (6 pages).

*Primary Examiner* — Andrew Jordan
(74) *Attorney, Agent, or Firm* — Osha Bergman Watanabe & Burton LLP

(57) ABSTRACT

A housing structure includes: an optical cable including optical fibers; connector units branching off from the optical cable; and a housing body that houses the connector units. Each of the connector units includes: a first tube through which the optical fibers pass; second tubes through each of which the optical fibers branching off from the first tube pass; and a connector group constituted by optical connectors that are each disposed at an end part of each of the second tubes. The connector group of each of the connector units is disposed at a different position in a length direction from the connector group of any other one of the connector units. The first tube of each of the connector units other than a first connector unit that is shortest among the connector units overlaps in the length direction the connector group of the first connector unit.

4 Claims, 13 Drawing Sheets

(56) References Cited

U.S. PATENT DOCUMENTS

| | | | | |
|---|---|---|---|---|
| 5,480,203 | A * | 1/1996 | Favalora | B25B 25/00 |
| | | | | 24/115 N |
| 5,768,460 | A * | 6/1998 | Levi | G02B 6/4403 |
| | | | | 385/59 |
| 5,903,693 | A * | 5/1999 | Brown | G02B 6/4471 |
| | | | | 385/100 |
| 5,966,489 | A * | 10/1999 | Harwell | G02B 6/4415 |
| | | | | 385/114 |
| 5,970,195 | A * | 10/1999 | Brown | G02B 6/4471 |
| | | | | 385/100 |
| 6,278,831 | B1 * | 8/2001 | Henderson | G02B 6/4473 |
| | | | | 385/103 |
| 6,389,214 | B1 * | 5/2002 | Smith | G02B 6/4472 |
| | | | | 385/86 |
| 6,438,299 | B1 * | 8/2002 | Brown | G02B 6/4471 |
| | | | | 385/100 |
| 6,738,555 | B1 * | 5/2004 | Cooke | G02B 6/4471 |
| | | | | 385/136 |
| 7,270,485 | B1 * | 9/2007 | Robinson | G02B 6/4471 |
| | | | | 385/136 |
| 7,409,127 | B1 * | 8/2008 | Hurley | G02B 6/4416 |
| | | | | 385/101 |
| 9,235,021 | B2 * | 1/2016 | Islam | G02B 6/4471 |
| 9,535,230 | B2 * | 1/2017 | Newbury | G02B 6/4471 |
| 9,557,503 | B2 * | 1/2017 | Guenter | G02B 6/4432 |
| 9,618,718 | B2 * | 4/2017 | Islam | G02B 6/4416 |
| 10,012,802 | B2 * | 7/2018 | Newbury | G02B 6/3885 |
| 10,459,183 | B2 * | 10/2019 | Mitobe | G02B 6/44526 |
| 11,300,749 | B2 * | 4/2022 | Hendrickson | G02B 6/545 |
| 11,366,277 | B2 * | 6/2022 | Kanno | G02B 6/4471 |
| 11,703,653 | B2 * | 7/2023 | Houser | G02B 6/4435 |
| | | | | 385/100 |
| 12,204,160 | B2 * | 1/2025 | Mitobe | G02B 6/4486 |
| 12,242,115 | B2 * | 3/2025 | Nakanishi | G02B 6/3885 |
| 2003/0210875 | A1 * | 11/2003 | Wagner | G02B 6/4472 |
| | | | | 385/100 |
| 2005/0002621 | A1 * | 1/2005 | Zimmel | G02B 6/4476 |
| | | | | 385/100 |
| 2005/0053341 | A1 * | 3/2005 | Zimmel | G02B 6/4453 |
| | | | | 385/111 |
| 2005/0276551 | A1 * | 12/2005 | Brown | G02B 6/4472 |
| | | | | 385/100 |
| 2006/0120672 | A1 * | 6/2006 | Cody | G02B 6/4472 |
| | | | | 385/86 |
| 2006/0147172 | A1 * | 7/2006 | Luther | G02B 6/4441 |
| | | | | 385/139 |
| 2006/0233506 | A1 * | 10/2006 | Noonan | G02B 6/4473 |
| | | | | 385/100 |
| 2007/0110384 | A1 * | 5/2007 | Cody | H04M 1/745 |
| | | | | 385/139 |
| 2008/0013888 | A1 * | 1/2008 | Barnes | G02B 6/4471 |
| | | | | 385/53 |
| 2008/0138026 | A1 * | 6/2008 | Yow | G02B 6/4477 |
| | | | | 385/137 |
| 2008/0253729 | A1 * | 10/2008 | Gronvall | G02B 6/4472 |
| | | | | 385/137 |
| 2009/0060440 | A1 * | 3/2009 | Wright | G02B 6/4478 |
| | | | | 385/135 |
| 2009/0074364 | A1 * | 3/2009 | Bringuier | G02B 6/02357 |
| | | | | 385/103 |
| 2009/0103881 | A1 * | 4/2009 | Gonzalez | G02B 6/4477 |
| | | | | 385/137 |
| 2012/0007717 | A1 * | 1/2012 | Jong | G02B 6/3895 |
| | | | | 343/720 |
| 2012/0106906 | A1 * | 5/2012 | Sakabe | G02B 6/448 |
| | | | | 385/106 |
| 2012/0308184 | A1 * | 12/2012 | Pina | G02B 6/4465 |
| | | | | 385/102 |
| 2013/0294733 | A1 * | 11/2013 | Wright | B29D 11/0075 |
| | | | | 385/99 |
| 2014/0355941 | A1 * | 12/2014 | Burris | G02B 6/255 |
| | | | | 385/101 |
| 2015/0260936 | A1 * | 9/2015 | Newbury | G02B 6/3825 |
| | | | | 29/505 |
| 2016/0041354 | A1 * | 2/2016 | Guenter | G02B 6/4431 |
| | | | | 385/86 |
| 2016/0327763 | A1 * | 11/2016 | Hurley | G02B 6/441 |
| 2017/0102504 | A1 * | 4/2017 | Follingstad | G02B 6/44775 |
| 2017/0102506 | A1 * | 4/2017 | Newbury | G02B 6/4471 |
| 2018/0024294 | A1 * | 1/2018 | Wang | G02B 6/2558 |
| | | | | 385/78 |
| 2019/0004273 | A1 | 1/2019 | Faulkner et al. | |
| 2019/0137713 | A1 * | 5/2019 | Mitobe | G02B 6/44526 |
| 2021/0231900 | A1 * | 7/2021 | Kanno | G02B 6/4471 |
| 2022/0050250 | A1 * | 2/2022 | Asada | G02B 6/04 |
| 2022/0120988 | A1 * | 4/2022 | Houser | G02B 6/3849 |
| 2022/0137303 | A1 * | 5/2022 | Otomitsu | G02B 6/3818 |
| | | | | 385/78 |
| 2022/0283382 | A1 * | 9/2022 | Mitobe | G02B 6/3857 |
| 2023/0042803 | A1 * | 2/2023 | Mitobe | H01B 13/00 |
| 2023/0063916 | A1 * | 3/2023 | Mitobe | G02B 6/54 |
| 2023/0141383 | A1 * | 5/2023 | Mitobe | G02B 6/46 |
| | | | | 385/100 |
| 2023/0161126 | A1 * | 5/2023 | Mitobe | G02B 6/4431 |
| | | | | 385/103 |

* cited by examiner

LENGTH
DIRECTION
REAR ←——————→ FRONT
(BASE END          (LEADING END
SIDE)                    SIDE)

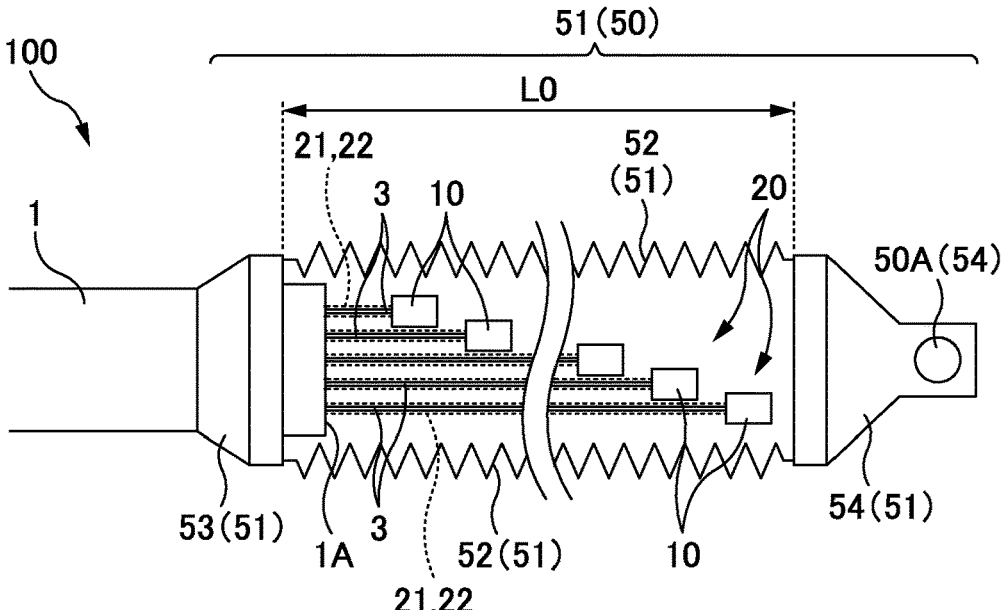
FIG. 3

(FIRST COMPARATIVE EXAMPLE)

FIG. 10A (PRESENT EMBODIMENT)

FIG. 10B (SECOND COMPARATIVE EXAMPLE)

LENGTH DIRECTION
REAR (BASE END SIDE) ← → FRONT (LEADING END SIDE)

EFFICIENT ALIGNMENT STRUCTURE FOR MULTIPLE CONNECTORS BRANCHING FROM A SINGLE OPTICAL CABLE

TECHNICAL FIELD

The present disclosure relates to a housing structure, a pulling-end-equipped optical cable, and a method for manufacturing a housing structure.

BACKGROUND

Patent Literature 1 discloses a cable pulling terminal structure used at the time of pulling an optical cable with a pulling device.

PATENT LITERATURE

Patent Literature 1: Japanese Patent Application Laid-open Publication No. 2010-217316

An optical cable can be laid from outside a station building to inside thereof by pulling a pulling part of a pulling-end-equipped optical cable. The laying task inside the station building after pulling-in the optical cable can be facilitated by attaching optical connectors in advance to respective end parts of optical fibers of the optical cable and by housing the optical connectors inside a pulling terminal structure. However, in cases of housing a multitude of optical connectors, the housing may become large. It should be noted that there are demands to reduce the size not only of housings for pulling-end-equipped optical cables, but also of housings configured to house a multitude of optical connectors provided to an end part of an optical cable.

SUMMARY

One or more embodiments of the present invention reduce the size of a housing body configured to house a multitude of optical connectors.

One or more embodiments of the invention relate to a housing structure including: an optical cable including optical fibers; connector units branching off from the optical cable; and a housing body configured to house the connector units. Each of the connector units includes: a first tube configured such that a plurality of the optical fibers are passed therethrough; second tubes, each configured such that a plurality of the optical fibers branching off from the first tube are passed therethrough; and a connector group constituted by optical connectors provided respectively at an end part of the respective second tubes. The respective connector groups of the connector units are located at different positions from one another in a length direction. In case where the shortest connector unit is defined as a first connector unit, the respective first tubes of the connector units other than the first connector unit are present in a region occupied in the length direction by the connector group of the first connector unit. In relation to at least one of the connector units whose connector group is located on a leading-end side with respect to the connector group of the first connector unit, the second tubes of the connector unit that is next longer than the at least one connector unit are present in a region occupied in the length direction by the connector group of the at least one connector unit.

One or more embodiments of the invention relate to a pulling-end-equipped optical cable including: an optical cable including optical fibers; connector units branching off from the optical cable; and a housing body configured to house the connector units. Each of the connector units includes: a first tube configured such that a plurality of the optical fibers are passed therethrough; second tubes, each configured such that a plurality of the optical fibers branching off from the first tube are passed therethrough; and a connector group constituted by optical connectors provided respectively at an end part of the respective second tubes. The respective connector groups of the connector units are located at different positions from one another in a length direction. In case where the shortest connector unit is defined as a first connector unit, the respective first tubes of the connector units other than the first connector unit are present in a region occupied in the length direction by the connector group of the first connector unit. In relation to at least one of the connector units whose connector group is located on a leading-end side with respect to the connector group of the first connector unit, the second tubes of the connector unit that is next longer than the at least one connector unit are present in a region occupied in the length direction by the connector group of the at least one connector unit.

One or more embodiments of the invention relate to a method for manufacturing a housing structure, the method involving: creating connector units that branch off from an optical cable and that each include a first tube, second tubes, and a connector group constituted by optical connectors provided respectively at an end part of the respective second tubes, by passing a plurality of optical fibers that branch off from the optical cable through the respective first tube, passing a plurality of the optical fibers that branch off from the first tube through the respective second tubes, and providing the optical connectors at an end part of the optical fibers that have been passed through the respective second tubes; and housing the connector units in a housing body in such a manner that: in case where the shortest connector unit is defined as a first connector unit, the respective first tubes of the connector units other than the first connector unit are present in a region occupied in a length direction by the connector group of the first connector unit; and, in relation to at least one of the connector units whose connector group is located on a leading-end side with respect to the connector group of the first connector unit, the second tubes of the connector unit that is next longer than the at least one connector unit are present in a region occupied in the length direction by the connector group of the at least one connector unit.

Other features of the present invention will be disclosed in the Description and Drawings as described below.

According to the present invention, it is possible to reduce the size of a housing body configured to house optical connectors.

BRIEF DESCRIPTION OF THE DRAWINGS

FIG. 3 is a diagram illustrating a terminal structure 50 according to a modified example.

FIG. 10A illustrates an arrangement of connector groups 23 according to one or more embodiments. FIG. 10B illustrates an arrangement of connector groups 23 according to a second comparative example.

DETAILED DESCRIPTION

Figure 1A:
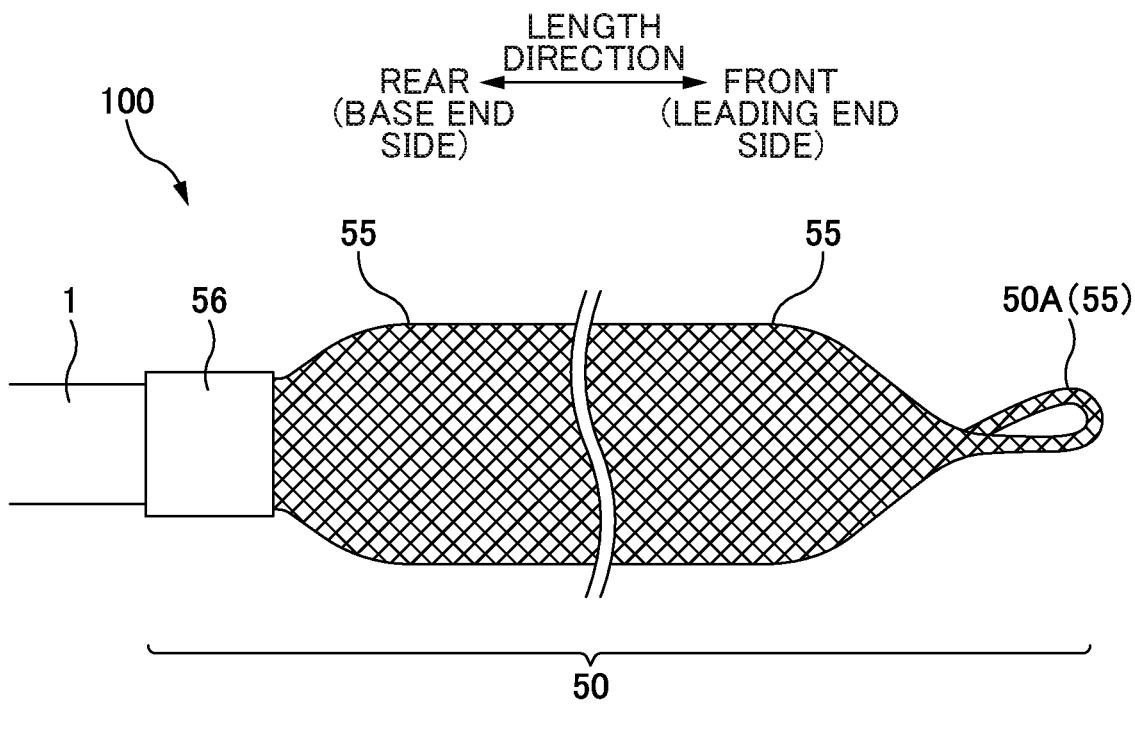
FIG. 1A is a diagram illustrating an outer appearance of a pulling-end-equipped optical cable 100 according to one or more embodiments.

At least the following features are disclosed in the Description and Drawings as described below.

Disclosed is a housing structure including: an optical cable including optical fibers; connector units branching off from the optical cable; and a housing body configured to house the connector units. Each of the connector units includes: a first tube configured such that a plurality of the optical fibers are passed therethrough; second tubes, each configured such that a plurality of the optical fibers branching off from the first tube are passed therethrough; and a connector group constituted by optical connectors provided respectively at an end part of the respective second tubes. The respective connector groups of the connector units are located at different positions from one another in a length direction. In case where the shortest connector unit is defined as a first connector unit, the respective first tubes of the connector units other than the first connector unit are present in a region occupied in the length direction by the connector group of the first connector unit. In relation to at least one of the connector units whose connector group is located on a leading-end side with respect to the connector group of the first connector unit, the second tubes of the connector unit that is next longer than the at least one connector unit are present in a region occupied in the length direction by the connector group of the at least one connector unit. With this housing structure, it is possible to reduce the diameter and length of the housing body and thereby reduce the size of the housing body.

In case where the second tubes of an [N+1]-th connector unit are present in a region occupied in the length direction by the connector group of an N-th connector unit, a distance in the length direction between the connector group of the N-th connector unit and the connector group of the [N+1]-th connector unit may be shorter than a distance in the length direction between the connector group of the first connector unit and the connector group of a second connector unit, where: the second connector unit is the connector unit that is next longer than the first connector unit; the N-th connector unit is an arbitrary connector unit; and the [N+1]-th connector unit is the connector unit that is next longer than the N-th connector unit. In this way, the housing body can be shortened.

In relation to one of the connector units whose connector group is located on the leading-end side with respect to the connector group of the N-th connector unit, the second tubes of another of the connector units may be present in a region occupied in the length direction by the connector group of the one connector unit. In this way, the housing body can be further shortened.

Also disclosed is a pulling-end-equipped optical cable including: an optical cable including optical fibers; connector units branching off from the optical cable; and a housing body configured to house the connector units. Each of the connector units includes: a first tube configured such that a plurality of the optical fibers are passed therethrough; second tubes, each configured such that a plurality of the optical fibers branching off from the first tube are passed therethrough; and a connector group constituted by optical connectors provided respectively at an end part of the respective second tubes. The respective connector groups of the connector units are located at different positions from one another in a length direction. In case where the shortest connector unit is defined as a first connector unit, the respective first tubes of the connector units other than the first connector unit are present in a region occupied in the length direction by the connector group of the first connector unit. In relation to at least one of the connector units whose connector group is located on a leading-end side with respect to the connector group of the first connector unit, the second tubes of the connector unit that is next longer than the at least one connector unit are present in a region occupied in the length direction by the connector group of the at least one connector unit. In this way, the size of the housing body can be reduced, and the optical cable can be pulled easily.

The pulling-end-equipped optical cable may further include a braided tube configured to house the housing body, wherein a pulling part is provided at an end part of the braided tube, and wherein an end part of the braided tube on an opposite side from the side with the pulling part is fixed to the optical cable. In this way, tensile force during pulling is applied to the braided tube and does not directly act on the housing body, and thus, the diameter of the housing body can be reduced.

Also disclosed is a method for manufacturing a housing structure, the method involving: creating connector units that branch off from an optical cable and that each include a first tube, second tubes, and a connector group constituted by optical connectors provided respectively at an end part of the respective second tubes, by passing a plurality of optical fibers that branch off from the optical cable through the respective first tube, passing a plurality of the optical fibers that branch off from the first tube through the respective second tubes, and providing the optical connectors at an end part of the optical fibers that have been passed through the respective second tubes; and housing the connector units in a housing body in such a manner that: in case where the shortest connector unit is defined as a first connector unit, the respective first tubes of the connector units other than the first connector unit are present in a region occupied in a length direction by the connector group of the first connector unit; and in relation to at least one of the connector units whose connector group is located on a leading-end side with respect to the connector group of the first connector unit, the second tubes of the connector unit that is next longer than the at least one connector unit are present in a region occupied in the length direction by the connector group of the at least one connector unit. In this way, it is possible to reduce the diameter and length of the housing body and thereby reduce the size of the housing body.

Figure 1B:
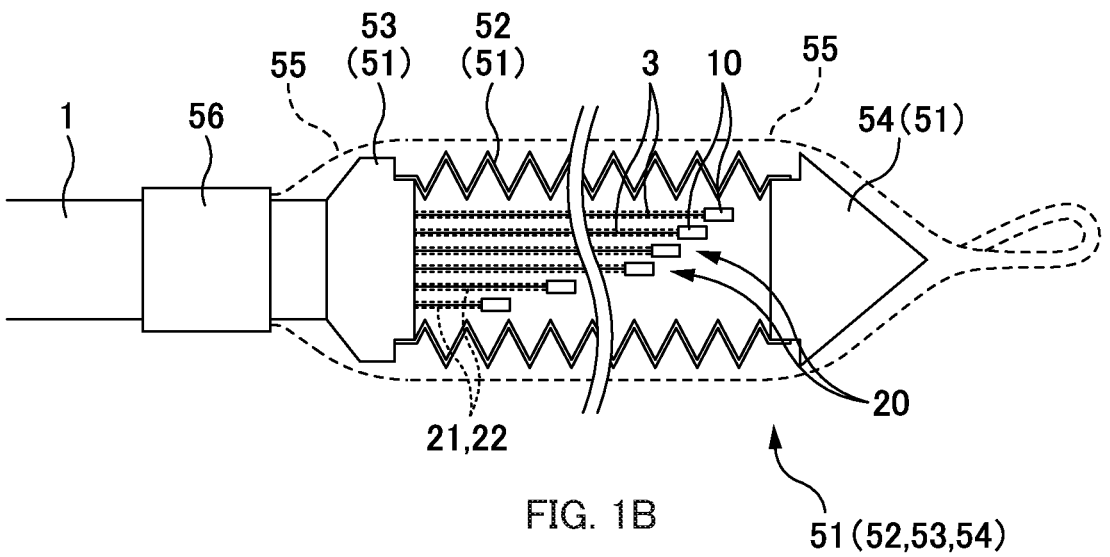
FIG. 1B is a diagram illustrating an inner structure of the pulling-end-equipped optical cable 100 according to one or more embodiments.

Configuration of Pulling-End-Equipped Optical Cable 100:

FIG. 1A is a diagram illustrating an outer appearance of a pulling-end-equipped optical cable 100 according to one or more embodiments. FIG. 1B is a diagram illustrating an inner structure of the pulling-end-equipped optical cable 100 according to one or more embodiments.

In the following description, as illustrated in FIG. 1A, the length direction of the pulling-end-equipped optical cable 100 is referred to as "front-rear direction", wherein the leading end side as viewed from the pulling-end-equipped optical cable 100 is referred to as "front", and the opposite side is referred to as "rear". The front side may be referred to as "leading end side", and the rear side may be referred to as "base end side".

Figure 13:
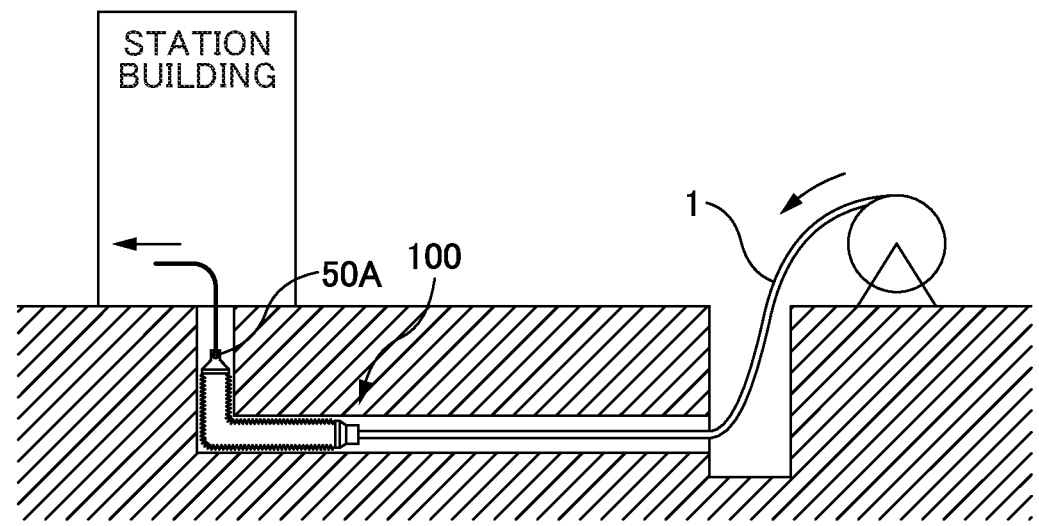
FIG. 13 is a diagram illustrating how an optical cable is laid from outside a station building to inside thereof by pulling a pulling part of a pulling-end-equipped optical cable.

The pulling-end-equipped optical cable 100 is an optical cable having a pulling part at an end part thereof. As illustrated in FIG. 13, an optical cable 1 can be laid from outside a station building to inside thereof by pulling the pulling part of the pulling-end-equipped optical cable 100. The pulling-end-equipped optical cable 100 includes an optical cable 1 and a terminal structure 50.

Figure 2:
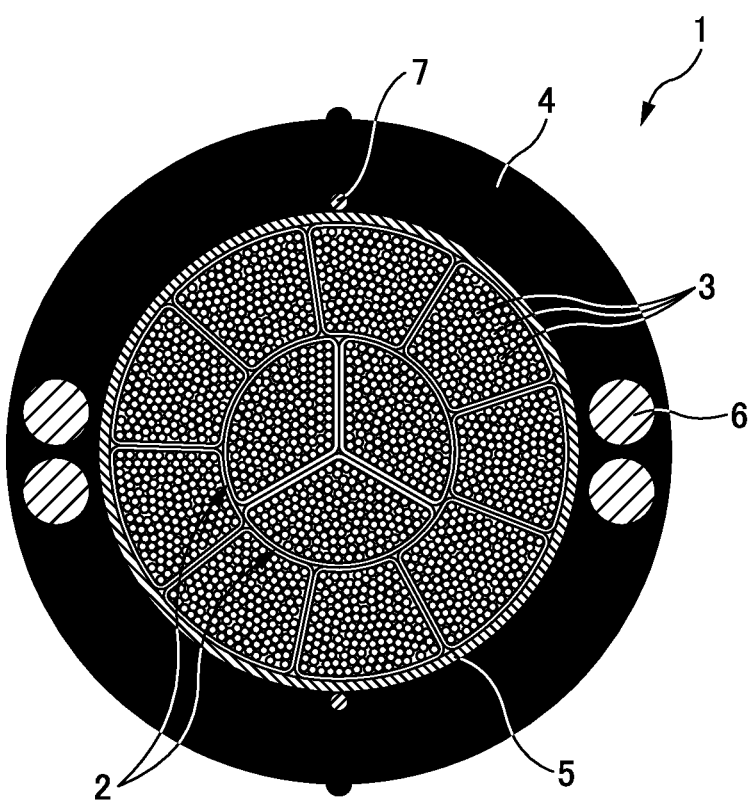
FIG. 2 is a diagram illustrating an optical cable 1.

FIG. 2 is a diagram illustrating the optical cable 1.

The optical cable 1 is a cable that houses a multitude of optical fibers 3 inside an outer sheath 4. The optical cable 1 includes a plurality of optical fiber units 2, a wrapping tape 5, and the aforementioned outer sheath 4. The optical fiber unit 2 is a unit in which a plurality of optical fibers 3 are bundled. Herein, the optical fiber unit 2 is constituted by bundling a plurality of intermittently connected optical fiber ribbons with a bundling member. Note that the optical cable 1 of one or more embodiments includes 288 optical fiber ribbons (optical fiber tapes), each constituted by twelve optical fibers 3, and hence includes a total of 3,456 optical fibers 3. The number of optical fiber ribbons and optical fibers 3, however, is not limited to the above. The plurality of optical fiber units 2 are housed inside the outer sheath 4 in a state wrapped by the wrapping tape 5. Tension members 6 and rip cords 7 are embedded within the outer sheath 4.

A multitude of optical fibers 3 (optical fiber ribbons) extend out from a lead-out part of the optical cable 1. In one or more embodiments, 288 optical fiber ribbons extend out from the lead-out part of the optical cable 1. (Note that, in FIG. 1B, the number of optical fiber ribbons is reduced for the sake of brevity.) An optical connector 10 is attached to an end part of the optical fibers 3. The optical connector 10 of one or more embodiments is constituted by a 24-fiber MPO connector. Hence, 144 optical connectors 10 are attached in the optical cable 1 of one or more embodiments. (Note that, in FIG. 1B, the number of optical connectors 10 is reduced for the sake of brevity.) The optical fibers 3 (optical fiber ribbons) leading out from the optical cable 1 are passed through later-described protection tubes (first tubes 21 and second tubes 22). The structure extending out from the lead-out part of the optical cable 1 (i.e., connector units 20 including optical connectors 10) will be described further below.

The terminal structure 50 is a structure provided to a terminal of the optical cable 1. The terminal structure 50 of one or more embodiments is a pulling terminal structure having a pulling part 50A. The terminal structure 50 of one or more embodiments is a structure that enables pulling of the optical cable 1 while housing the connector units 20 (described below). The pulling part 50A is a section for pulling the optical cable 1. The terminal structure 50 includes a housing body 51 and a braided tube 55.

The housing body 51 is a housing member configured to house a plurality of optical connectors 10 (and later-described connector units 20). The housing body 51 of one or more embodiments includes a housing tube 52, a housing tube fixing part 53, and a front member 54. The interior space within the housing body 51 constitutes a housing space for housing the optical connectors 10 (and the later-described connector units 20). Stated differently, the space surrounded by the housing tube 52, the housing tube fixing part 53, and the front member 54 serves as the housing space. It should be noted that a structure constituted by the optical cable 1 and the housing body 51 housing the plurality of optical connectors 10 (and the later-described connector units 20) may also be referred to as "housing structure".

The housing tube 52 is a cylindrical (tubular) member configured to house the optical connectors 10. The housing tube 52 of one or more embodiments houses the connector units 20 (described later) extending out from the lead-out part of the optical cable 1. The housing tube 52 functions to protect the connector units 20. In one or more embodiments, the housing tube 52 is constituted by a tube having flexibility (i.e., a flexible tube), and more specifically, a corrugated pipe. Note, however, that the housing tube 52 may be constituted by a type of tube/pipe different from the corrugated pipe, so long as the housing tube has a certain degree of flexibility that makes bending possible in an underground conduit as illustrated in FIG. 13. The housing tube 52 is located inside the braided tube 55. The housing tube fixing part 53 is located on the rear side of the housing tube 52. The housing tube 52 is fixed to the optical cable 1 via the housing tube fixing part 53. The front member 54 is located on the front side of the housing tube 52.

The housing tube fixing part 53 is a member configured to fix the housing tube 52 to the optical cable 1. The housing tube fixing part 53 is located in the vicinity of the lead-out part 1A of the optical cable 1. The housing tube 52 is attached to the front side of the housing tube fixing part 53. Note that the housing tube fixing part 53 reinforces the housing tube 52 by being fitted to the rear edge of the housing tube 52.

The front member 54 is a member constituting a front part of the housing body 51. The front member 54 reinforces the housing tube 52 by being fitted to the front edge of the housing tube 52.

The braided tube 55 is a member made by braiding fiber members in a tube shape. Stated differently, the braided tube 55 is a tube made by braiding fiber members in a mesh form. The fiber members constituting the braided tube 55 may be, for example, resin fibers or metal wiring (wires). The leading end of the braided tube 55 is provided with the pulling part 50A. When the pulling part 50A is pulled, a large tensile force is applied to the braided tube 55, but the braided tube 55, which is constituted by a multitude of fiber members, has sufficient durability against such tensile force. Further, the braided tube 55 has a certain degree of flexibility that makes bending possible in an underground conduit as illustrated in FIG. 13.

The housing body 51 is located inside the braided tube 55. The braided tube 55 functions to protect the housing body 51 from friction with the inner wall surface of an underground conduit as illustrated in FIG. 13. Also, the end part of the optical cable 1 is housed inside the braided tube 55. The braided tube 55's end part on the base end side is fixed to the optical cable 1 by the tube fixing part 56. For example, the tube fixing part 56 is constituted by a heat-shrinkable tube, and the braided tube 55 is fixed to the optical cable 1 by sandwiching the rear edge of the braided tube 55 between the heat-shrinkable tube and the optical cable 1. The braided tube 55's end part on the leading end side is provided with the pulling part 50A. The pulling part 50A is a section configured to be pulled with a pulling device such as a winch. The pulling part 50A may be referred to as "pulling end". The pulling part 50A of one or more embodiments is constituted by forming an excessive-length portion at the leading end of the braided tube 55 in a ring shape. That is, in one or more embodiments, the pulling part 50A is formed integrally with the braided tube 55. Note, however, that the pulling part 50A is not limited to such a configuration, and may be provided to a separate member other than the braided tube 55.

FIG. 3 is a diagram illustrating a terminal structure 50 according to a modified example. The terminal structure 50 of the modified example includes a housing body 51. As illustrated in this modified example, the terminal structure 50 does not have to include the aforementioned braided tube 55. The housing body 51 of the modified example includes a housing tube 52, a housing tube fixing part 53, and a front member 54, and the front member 54 is provided with a pulling part 50A. As illustrated in this modified example, the pulling part 50A does not have to be provided to the braided tube 55, and may be provided to the front part of the housing body 51.

It should be noted that, as regards the terminal structure 50 of one or more embodiments as illustrated in FIGS. 1A and 1B, tensile force during pulling is applied directly to the braided tube 55, and does not directly act on the housing tube 52. Hence, according to one or more embodiments, it is possible to suppress destruction of the housing tube 52 caused by application of tensile force on the housing tube 52. In contrast, as regards the terminal structure 50 of the modified example as illustrated in FIG. 3, tensile force during pulling is applied to the housing tube 52. The housing tube 52, which is constituted by a corrugated pipe, is relatively weak against tensile force. Hence, if the housing tube is to be provided with a structure that can withstand the tensile force during pulling, it will be difficult to reduce the diameter of the housing tube 52. In contrast, in one or more embodiments, the tensile force during pulling does not act on the housing tube 52, and thus, the diameter of the housing tube 52 can be reduced.

Conversely, the more the housing tube 52's diameter is reduced, the smaller the housing space inside the housing body 51 becomes. Note, however, that with one or more embodiments, a multitude of optical connectors 10 (144 optical connectors 10 in this example) can be housed inside the small housing space of the housing body 51, as will be described below.

Figure 4:
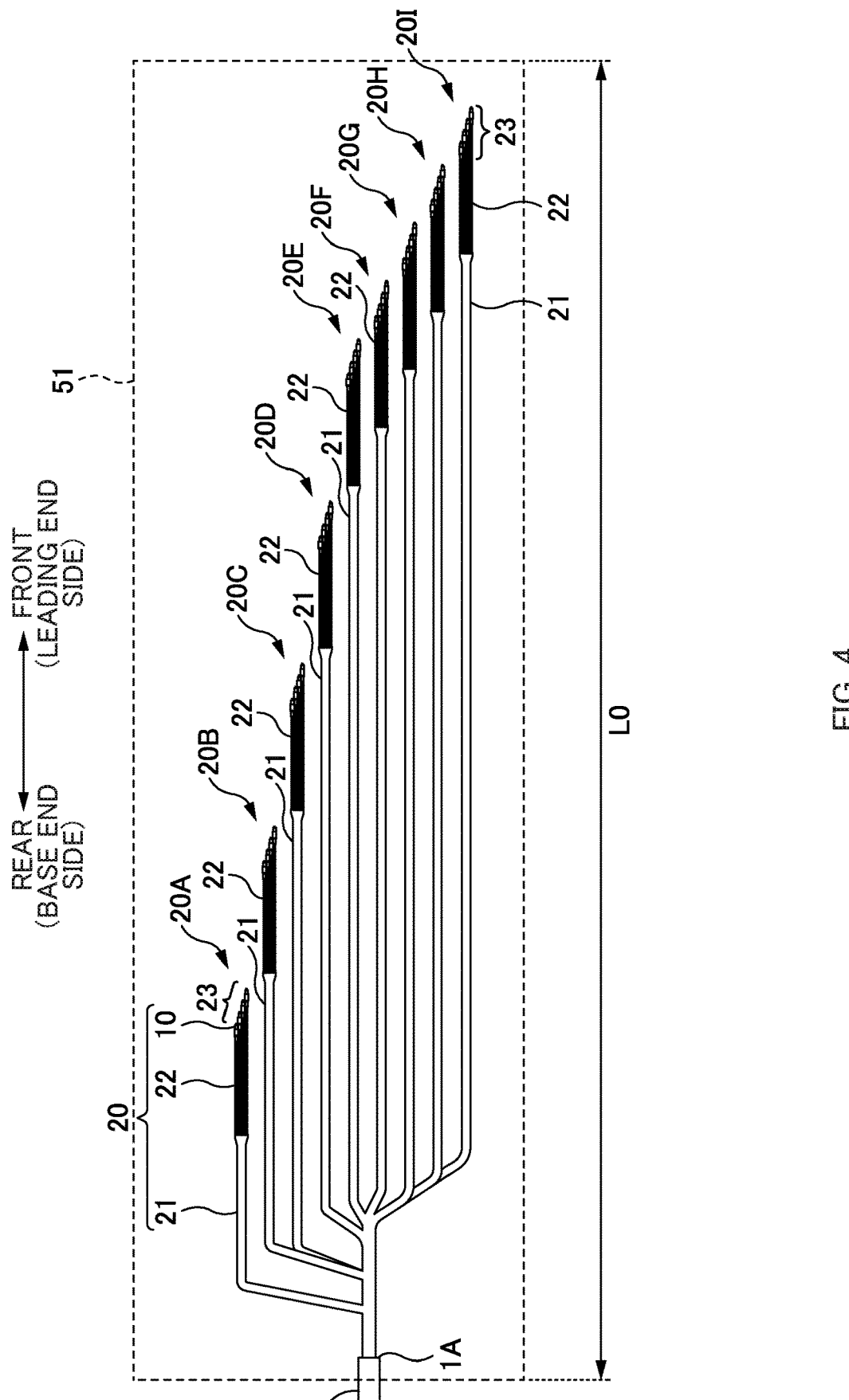
FIG. 4 is a diagram illustrating connector units 20 extending out from a lead-out part of an optical cable 1.
Figure 5A:
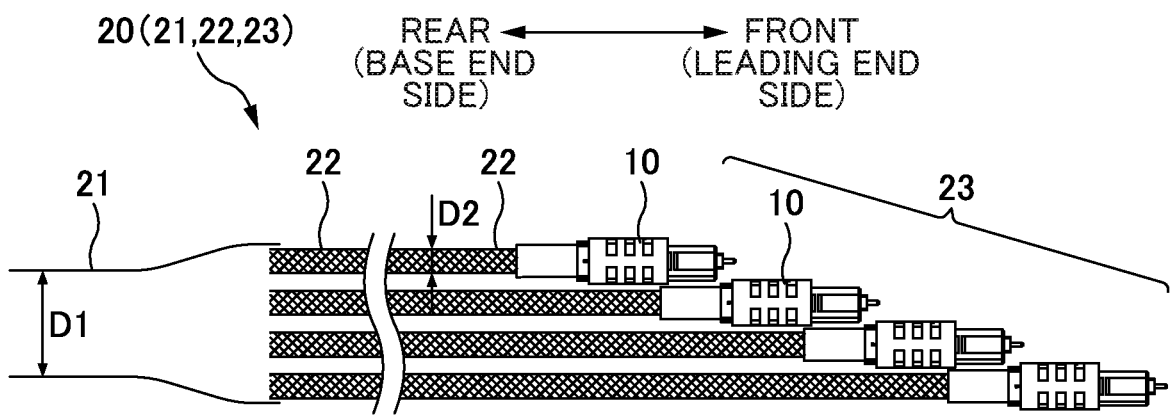
FIGS. 5A and 5B are diagrams illustrating a leading end part of an arbitrary connector unit 20.
Figure 5B:
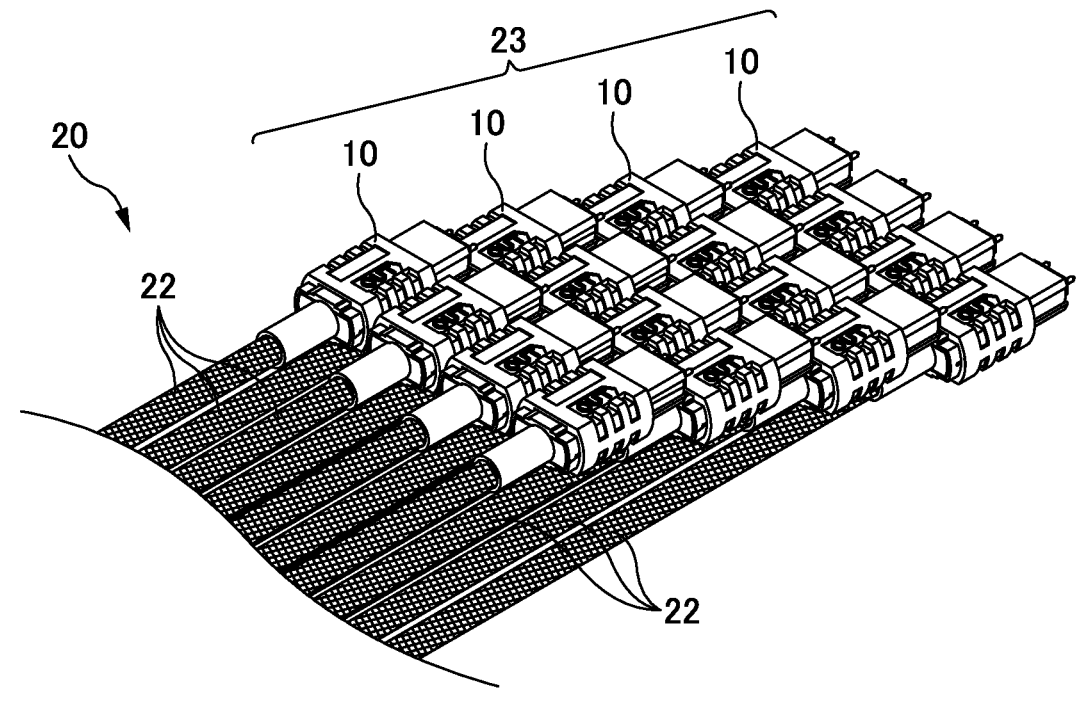

Connector Units 20:

FIG. 4 is a diagram illustrating the connector units 20 extending out from the lead-out part of the optical cable 1. FIGS. 5A and 5B are diagrams illustrating a leading end part of an arbitrary connector unit 20.

In one or more embodiments, a plurality of (in this example, nine) connector units 20 branch off and extend out from the lead-out part 1A of the optical cable 1. The plurality of connector units 20 are housed inside the housing space of the housing body 51. In FIG. 4, for the sake of explanation, the housing space of the housing body 51 is illustrated in an enlarged/expanded manner, and the connector units 20 are illustrated with spaces therebetween.

In the description below, the connector units 20 may be referred as the first connector unit 20A, the second connector unit 20B, . . . , the ninth connector unit 20I, in order from the shortest connector unit. Hence, if an arbitrary connector unit 20 (except for the longest connector unit 20) is defined as the N-th connector unit 20, the connector unit 20 that is next longer than the N-th connector unit 20 can be expressed as the [N+1]-th connector unit 20.

A single connector unit 20 includes: a plurality of (in this example, sixteen) optical connectors 10; a single first tube 21; and the same number of second tubes 22 as the optical connectors 10. Note that the optical connectors 10 (the sixteen optical connectors 10 in this example) of a single connector unit 20 may also be referred to as "connector group 23". So, stated differently, a single connector unit 20 includes: a single first tube 21; a plurality of second tubes 22; and a connector group 23.

The first tube 21 is a member located on the base-end side with respect to the second tubes 22, and is a protection tube for protecting a plurality of the optical fibers 3. The first tube 21 may also be referred to as "primary tube". A plurality of the optical fibers 3 branching off from the optical cable 1 are passed through the first tube 21. In this example, 384 optical fibers (i.e., 32 pieces of 12-fiber optical fiber ribbons) are passed through the first tube 21. Note, however, that the number of optical fibers to be passed through the first tube 21 is not limited thereto.

Each second tube 22 is a member located on the base-end side with respect to the optical connector 10, and is a protection tube for protecting the optical fibers extending out from the optical connector 10. A plurality of the optical fibers 3 branching off from the first tube 21 are passed through the respective second tube 22. The second tube 22 may also be referred to as "secondary tube". Each second tube 22 is arranged between the first tube 21 and the optical connector 10. As will be described below, the front end part of the second tube 22 is attached to the optical connector 10. The rear end part of the second tube 22 is arranged at a branching part of the first tube 21.

Since a plurality of optical fibers branching off from the first tube 21 are passed through each second tube 22, the number of optical fibers passed through each second tube 22 is smaller than the number of optical fibers passed through the first tube 21. In this example, the 384 optical fibers (i.e., 32 pieces of 12-fiber optical fiber ribbons) passed through the first tube 21 are separated into sixteen branches, and 24 optical fibers (i.e., 2 pieces of 12-fiber optical fiber ribbons) are passed through each second tube 22. Note, however, that the number of optical fibers to be passed through each second tube 22 is not limited thereto. In one or more embodiments, a single connector unit 20 includes sixteen second tubes 22. Note, however, that the number of second tubes 22 (or the number of branches of optical fibers) in each connector unit 20 is not limited thereto.

The first tubes 21 and the second tubes 22 are each constituted by a braided tube. A braided tube is a member made by braiding fiber members in a tube shape. In one or more embodiments, the first tubes 21 and the second tubes 22 are constituted by polyester resin fibers. Note, however, that the material for the first tubes 21 and the second tubes 22 is not limited to polyester. Further, the first tubes 21 and the second tubes 22 do not necessarily have to be constituted by braided tubes. For example, the first tubes 21 and the second tubes 22 may be constituted by silicone tubes.

Each second tube 22 has a smaller inner diameter and outer diameter than the first tube 21, as each contains a smaller number of optical fibers. Note, however, that the number of second tubes 22 is greater than the number of first tubes 21, and in one or more embodiments, there are sixteen second tubes 22 with respect to a single first tube 21. Further, in one or more embodiments, the total of cross-sectional areas of the plurality of (in this example, sixteen) second tubes 22 in a single connector unit 20 is larger than the cross-sectional area of the first tube 21. Further, in one or more embodiments, the cross-sectional area of a bundle of the plurality of (in this example, sixteen) second tubes 22 in a single connector unit 20 is larger than the cross-sectional area of the first tube 21.

The connector group 23 is an assembly constituted by a plurality of the optical connectors 10. In this example, each connector group 23 is constituted by sixteen optical connectors 10 (see FIGS. 5A and 5B). Note, however, that the number of optical connectors 10 constituting the connector group 23 is not limited to sixteen. In this example, each connector group 23 is constituted by four sets of optical connectors 10, each set including four optical connectors 10 which are located at the same position in the length direction (thus, there are sixteen optical connectors 10 in total). The positions, in the length direction, of the respective sets of optical connectors 10 are gradually shifted from one another. More specifically, the positions, in the length direction, of the respective sets of optical connectors 10 are shifted from one another stepwise by a length worth approximately a single optical connector 10. If all of the optical connectors 10 in the connector group 23 were arranged at the same position in the length direction, the cross-sectional area of the entire connector group 23 would increase, thus making it difficult to house the connector group 23 in the housing body 51's small housing space. In contrast, by locating the respective sets of optical connectors 10 at positions that are gradually different from one another in the length direction as in one or more embodiments, the cross-sectional area of the connector group 23 can be reduced, and thus, the connector group 23 can easily be housed in the housing body 51's small housing space. Note that, in one or more embodiments, four optical connectors 10 constitute a single set, but the number of optical connectors is not limited thereto. For example, eight optical connectors 10 may constitute a single set, and the connector group 23 may be constituted by two sets of optical connectors 10.

As described above, the housing structure of one or more embodiments includes: an optical cable 1; connector units 20 branching off from the optical cable 1; and a housing body 51 configured to house the connector units 20. Each connector unit 20 includes: a first tube 21 configured such that a plurality of optical fibers branching off from the optical cable are passed therethrough; a plurality of second tubes 22, each configured such that a plurality of optical fibers branching off from the first tube 21 are passed therethrough; and a connector group 23 constituted by a plurality of optical connectors 10 (the same number as the second tubes 22) provided respectively at an end part of the respective second tubes 22. Next, an example of the optical connector 10 will be described.

Figures 6A, 6B, 6C:
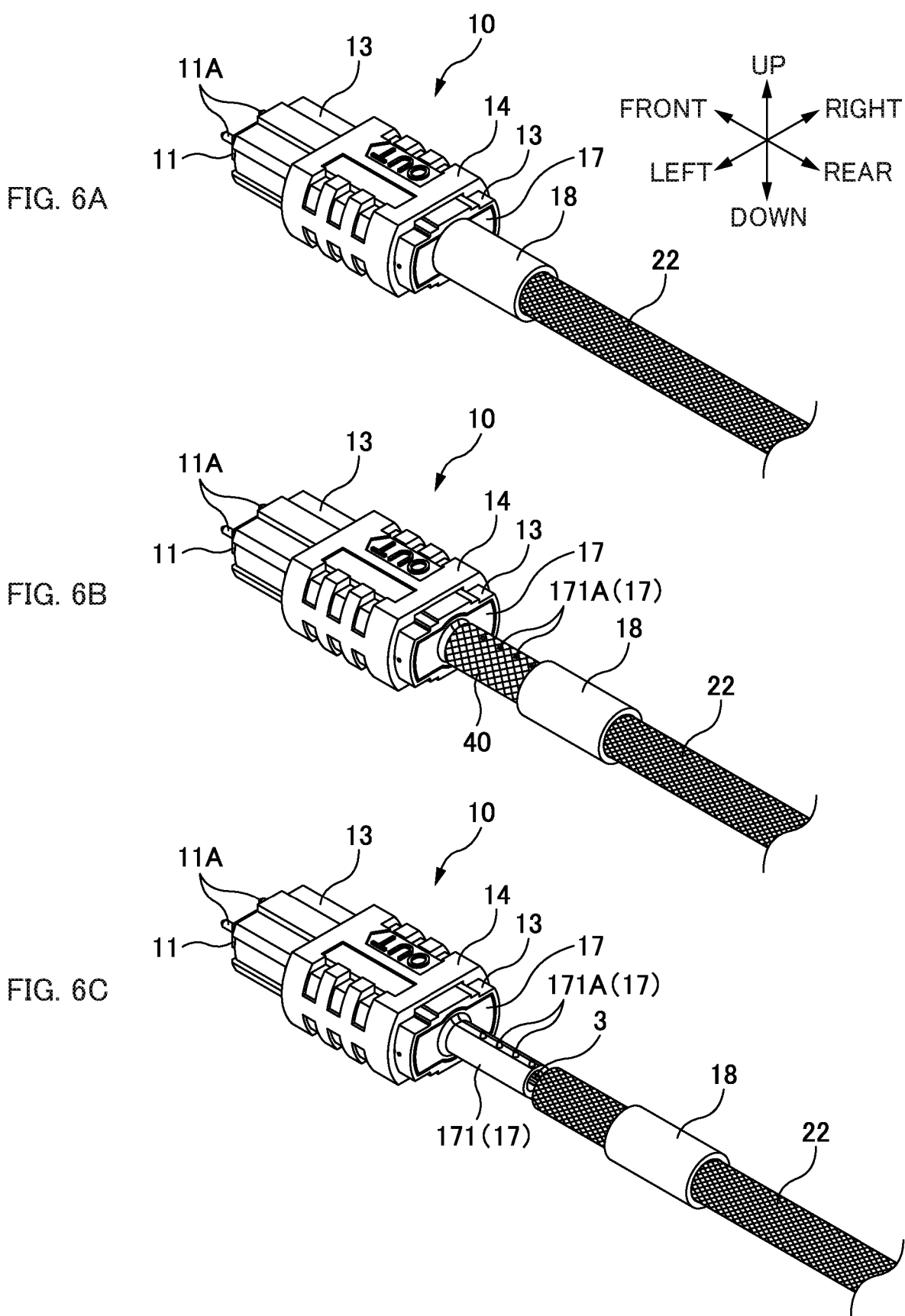
FIG. 6A is a diagram illustrating an optical connector 10 according to one or more embodiments.
FIG. 6B is a diagram illustrating a state in which a tubular member 18 of FIG. 6A has been removed.
FIG. 6C is a diagram illustrating a state in which the tubular member 18 and second tube 22 of FIG. 6A have been removed.
Figure 7:
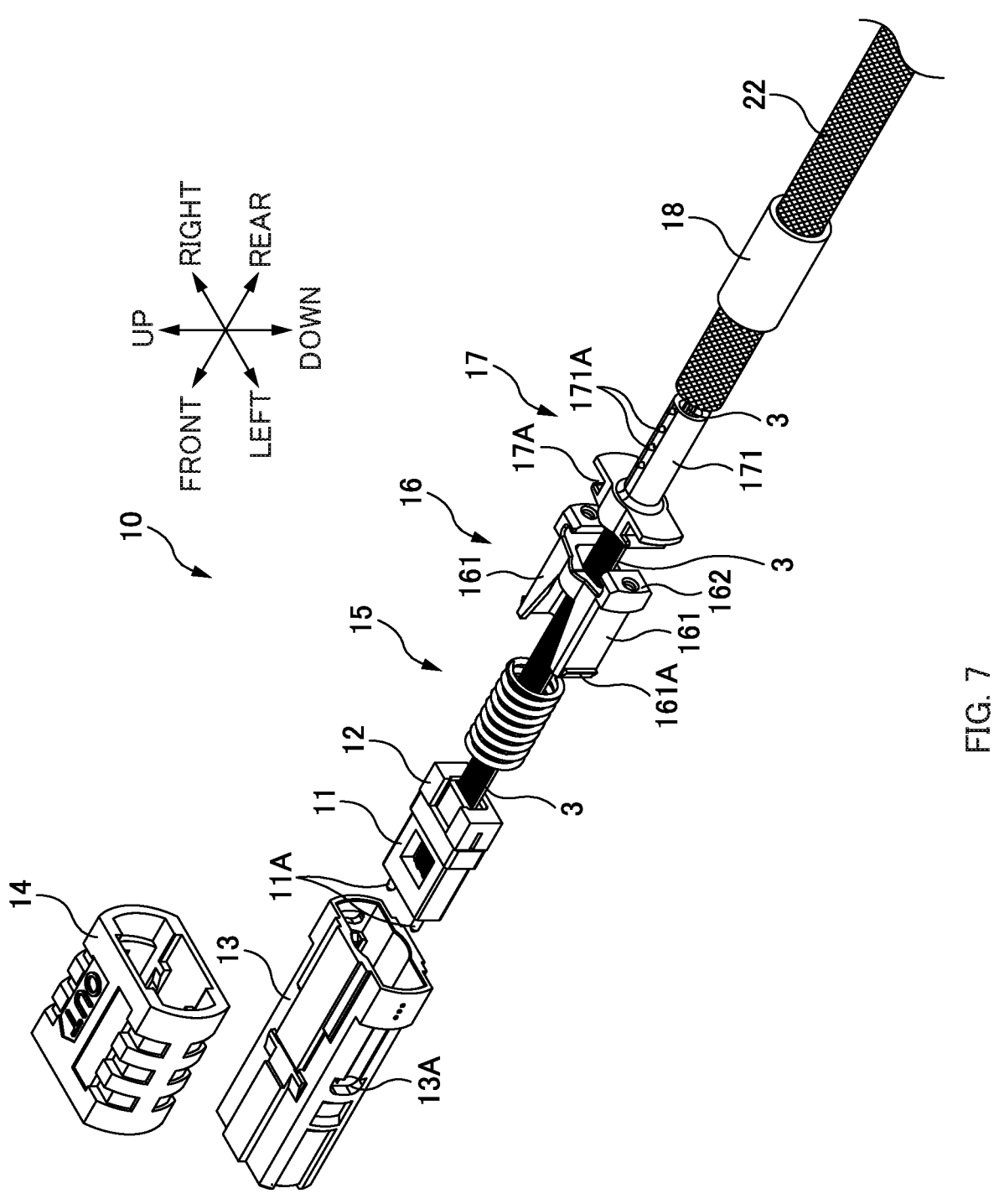
FIG. 7 is an exploded view of the optical connector 10 according to one or more embodiments.

FIG. 6A is a diagram illustrating an optical connector 10 according to one or more embodiments. FIG. 6B is a diagram illustrating a state in which a tubular member 18 of FIG. 6A has been removed. FIG. 6C is a diagram illustrating a state in which the tubular member 18 and second tube 22 of FIG. 6A have been removed. FIG. 7 is an exploded view of the optical connector 10 according to one or more embodiments.

The optical connector 10 of one or more embodiments is an MPO connector (a F13-type multi-fiber optical connector as defined in JIS C 5982). The optical connector 10 of one or more embodiments includes a ferrule 11, a pin clamp 12, a housing 13, a coupling 14, a spring 15, a spring pusher 16, and a fixing member 17. Note, however, that the configuration of the optical connector 10 is not limited thereto, and it will suffice if the optical connector includes a ferrule 11, a housing 13, and a fixing member 17.

The ferrule 11 is a member for retaining an end part of the optical fiber 3. The ferrule 11 of one or more embodiments is an MT ferrule (a F12-type multi-fiber optical connector as defined in JIS C 5981). The ferrule 11 has a plurality of fiber holes, and the optical fibers 3 are passed through and fixed in the respective fiber holes. The pin clamp 12 is arranged on the rear side of the ferrule 11. The ferrule 11 is pressed toward the front by the spring 15 via the pin clamp 12. A flange part (collar part) of the ferrule 11 comes into contact with a protrusion (not illustrated) formed on the inner wall surface of the housing 13, and thereby, the ferrule 11, which is being pressed toward the front, is prevented from falling out frontward.

The housing 13 is a member for housing the ferrule 11 in a retractable manner. The housing 13 houses the ferrule 11, the pin clamp 12, the spring 15, and the spring pusher 16. Engagement holes 13A are formed in the respective side surfaces of the housing 13. The engagement holes 13A are holes for engagement with the spring pusher 16 (more specifically, claw parts 161A).

The coupling 14 is a member to be provided outside the housing 13. By sliding the coupling 14 rearward, the optical connector 10 can be detached from an adapter (not illustrated). The spring 15 is an elastic member for pressing the ferrule 11. The spring 15 is arranged in a compressed and deformed state between the pin clamp 12 and the spring pusher 16. The spring pusher 16 is a receiving part (spring receiving member) for fixing the rear end of the spring 15 with respect to the housing 13. The spring pusher 16 includes a pair of aim parts 161 and a fitting part 162. The aim parts 161 are parts to be engaged with the housing 13. The spring 15 is to be arranged between the pair of arm parts 161. A claw part 161A is formed at an end part of each aim part 161. The claw parts 161A engage with the respective engagement holes 13A of the housing 13, and thereby, the spring pusher 16 is fixed to the housing 13. The fitting part 162 is a section for fixing the fixing member 17.

The fixing member 17 is a member for fixing an end part of the second tube 22. The fixing member 17 includes a fitting part 17A and a tubular part 171. The fitting part 17A is a section to be fixed to the fitting part 162 of the spring pusher 16. By fitting the fitting part 17A to the fitting part 162 of the spring pusher 16, the fixing member 17 is fixed with respect to the housing 13. The tubular part 171 is a tubular section constituting a rear part of the fixing member 17. In one or more embodiments, the tubular part 171 is formed in the shape of a circular cylinder. Note, however, that the tubular part 171 may be an elliptic cylinder or a polygon cylinder. The fixing member 17 (and the tubular part 171) has a through hole formed therein along the front-rear direction, and the optical fibers 3 (in this example, two optical fiber ribbons) can be passed through this through hole.

In one or more embodiments, the tubular part 171 has protrusion parts 171A. The protrusion parts 171A are sections (pin-shaped sections) protruding outward from the outer circumferential surface of the tubular part 171. When the second tube 22 (which is a braided tube) is placed over the tubular part 171, the protrusion parts 171A can be inserted in the mesh holes of the second tube 22. In this way, the second tube 22 gets caught by the tubular part 171, and thereby, the second tube 22 can be suppressed from getting detached from the tubular part 171, and the second tube 22 can be retained on the optical connector 10. Further, since the second tube 22 can be suppressed from getting detached from the tubular part 171, it is possible to keep protecting the optical fibers 3 which extend out from the rear side of the optical connector 10. With one or more embodiments, the second tube 22 can be retained on the housing 13 with a simple structure, and thus, the length of the optical connector 10 can be shortened easily. Reduction in the length of the optical connector 10 can in turn reduce the length of the connector group 23, and as a result, the length L0 of the housing body 51 can also be shortened.

As illustrated in FIGS. 6A to 6C (and FIG. 7), the fixing member 17 of one or more embodiments further includes a tubular member 18. The tubular member 18 is a circular-cylindrical member which is separate from the main body of the fixing member 17. By fitting the tubular member 18 onto the tubular part 171, the second tube 22 can be sandwiched between the outer circumferential surface of the tubular part 171 and the inner circumferential surface of the tubular member 18. In this way, the second tube 22 can be suppressed from getting detached from the tubular part 171. Note, however, that the second tube 22 may be fixed to the fixing member 17 without using the tubular member 18.

The configuration of the optical connector 10 is not limited to the above. Note, however, that the cross-sectional area of the optical connector 10 of one or more embodiments is larger than the cross-sectional area of the second tube 22.

Figure 8:
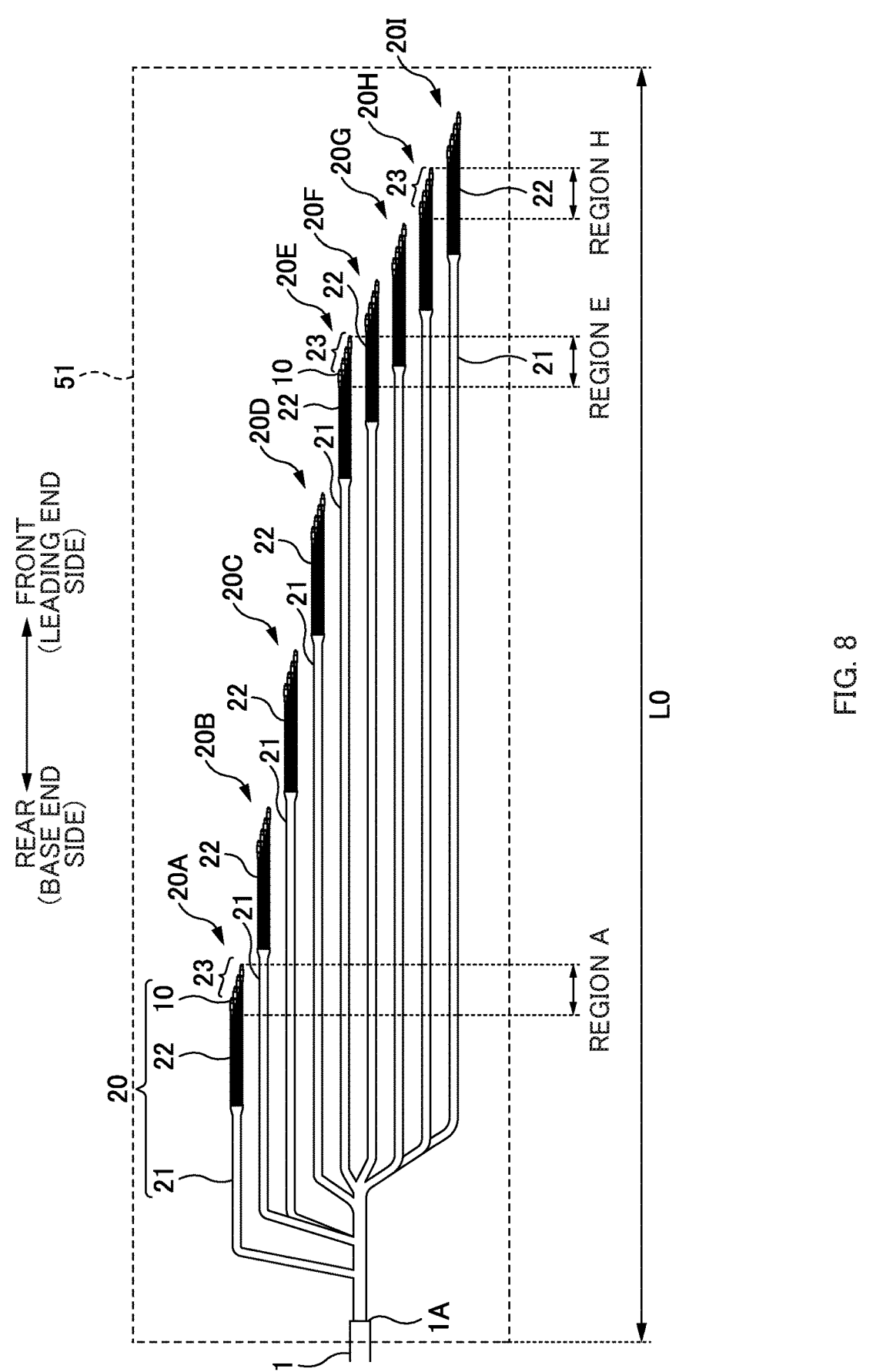
FIG. 8 is a diagram illustrating an arrangement of connector groups 23 according to one or more embodiments.

Arrangement of Connector Groups 23 in Respective Connector Units 20:

FIG. 8 is a diagram illustrating an arrangement of connector groups 23 according to one or more embodiments. FIG. 8 illustrates an alignment of a plurality of connector units 20 of one or more embodiments.

As described above, in one or more embodiments, nine pieces (nine units) of connector units 20 are housed in the housing space of the housing body 51. Hence, in one or more embodiments, nine sets (nine groups) of connector groups 23 are housed in the housing space of the housing body 51. If the nine connector groups 23 were all arranged at the same position in the length direction, it would be difficult to house the connector groups 23 in the housing body 51's small housing space, because the cross-sectional area of each optical connector 10 is relatively large (compared to the cross-sectional area of the first tube 21 or the second tube 22). So, in one or more embodiments, the respective connector groups 23 of the connector units 20 are located at different positions in the length direction and gradually shifted from one another. However, when the positions of the connector groups 23 of the respective connector units 20 are gradually shifted from one another in the length direction, the length (dimension in the length direction) of the housing body 51 may become large. To address this, one or more embodiments arrange the connector groups 23 as illustrated in FIG. 8, to suppress an increase in the length of the housing body 51. The arrangement of connector groups 23 of one or more embodiments will be described below.

As illustrated in FIG. 8, the shortest connector unit 20 among the nine connector units 20 is the first connector unit 20A. Herein, a region occupied in the length direction by the connector group 23 of the first connector unit 20A is defined as "region A". In the region A, in addition to the connector group 23 of the first connector unit 20A, there are eight first tubes 21 of the other eight connector units 20.

In the region A illustrated in FIG. 8, the connector group 23 of the first connector unit 20A, as well as the eight first tubes 21 of the other eight connector units 20, are arranged, but not the second tubes 22 of the other eight connector units 20. Hence, the total of the cross-sectional areas of structures occupying the region A is the total of the cross-sectional area of the connector group 23 of the first connector unit 20A and the cross-sectional areas of the eight first tubes 21.

Figure 9:
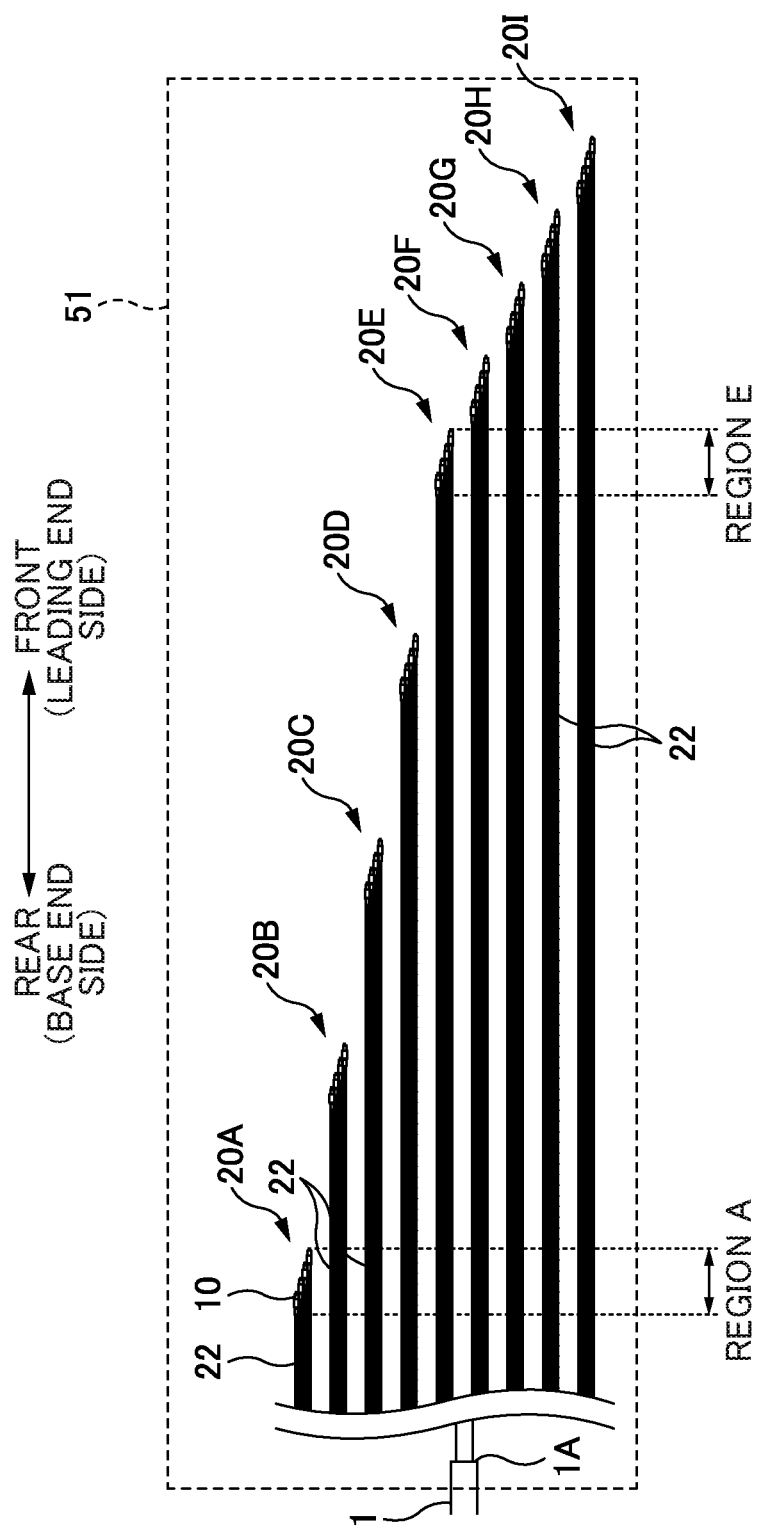
FIG. 9 is a diagram illustrating a first comparative example.

FIG. 9 is a diagram illustrating a first comparative example. In the first comparative example, the connector unit 20 does not include the first tube 21, but instead, the second tubes 22 attached to the respective optical connectors 10 extend up to the lead-out part 1A of the optical cable 1. As a result, in the first comparative example, the region A includes the connector group 23 of the first connector unit 20A and a multitude of second tubes 22 of the other eight connector units 20. Hence, the total of the cross-sectional areas of structures occupying the region A is the total of the cross-sectional area of the connector group 23 of the first connector unit 20A and the cross-sectional areas of the second tubes 22 worth eight units (i.e., 128 second tubes 22).

As described above, the total cross-sectional area of the plurality of (in this example, sixteen) second tubes 22 in a single connector unit 20 is larger than the cross-sectional area of the first tube 21. So, if the second tubes 22 of other connector units 20 are present in the region A as illustrated in the first comparative example of FIG. 9, the total cross-sectional area of structures occupying the region A will increase. (As a result, in the first comparative example, the housing body 51 needs to be made thick (increased in diameter) to increase the housing space.) In contrast, with one or more embodiments illustrated in FIG. 8, the region A includes the first tubes 21 of the eight connector units 20 other than the first connector unit 20A, and thus, the total cross-sectional area of structures occupying the region A can be reduced. In this way, one or more embodiments can reduce the diameter of the housing body 51 (more specifically, the housing tube 52).

In one or more embodiments, as illustrated in FIG. 8, the connector group 23 of the second connector unit 20B (i.e., the connector unit 20 that is next longer than the first connector unit 20A) is arranged on the leading-end side with respect to the connector group 23 of the first connector unit 20A to an extent that the second tubes 22 of the second connector unit 20B are not present in the region A. With this configuration, the first tube 21 of the second connector unit 20B will be present in the region A. Further, by arranging the connector group 23 of the second connector unit 20B in this way, the respective first tubes 21 of other connector units 20 that are longer than the second connector unit 20B will also be present in the region A. So, by arranging the connector group 23 of the second connector unit 20B on the leading-end side, i.e., the front side, with respect to the connector group 23 of the first connector unit 20A to an extent that the second tubes 22 of the second connector unit 20B are not present in the region A, the connector group 23 of the first connector unit 20A and the respective first tubes 21 of the other eight connector units 20 will be arranged in the region A.

Note that, similar to the first connector unit 20A, also in relation to the second connector unit 20B, only the respective first tubes 21 of the other connector units 20 (i.e., the third connector unit 20C to the ninth connector unit 20I) are present in a region occupied by the connector group 23 of the second connector unit 20B (or overlap the connector group 23 of the second connector unit 20B), and the second tubes 22 of the other connector units 20 are not present (or do not overlap). With this configuration, also in the region occupied by the connector group 23 of the second connector unit 20B, the cross-sectional area of structures within that region can be reduced.

Similarly, also in relation to the third connector unit 20C and the fourth connector unit 20D, only the respective first tubes 21 of the other connector units 20 are present in a region occupied by the connector group 23 of that connector unit 20, and the second tubes 22 of the other connector units 20 are not present. With this configuration, also in the region occupied by the connector group 23 of the third connector unit 20C or the fourth connector unit 20D, the cross-sectional area of structures within that region can be reduced.

Note that, as illustrated in FIG. 8, in the region A (i.e., the region occupied by the connector group 23 of the first connector unit 20A), there are nine connector units 20 (i.e., the first connector unit 20A to the ninth connector unit 20I), including the connector group 23 of the first connector unit 20A. In contrast, in a region occupied by the connector group 23 of another connector unit 20 different from the first connector unit 20A, at least structures included in the first connector unit 20A are not present, and hence, the cross-sectional area of structures within that region decreases. For example, in the region occupied by the connector group 23 of the second connector unit 20B, there are eight connector units 20 (i.e., the second connector unit 20B to the ninth connector unit 20I), but none of the structures of the first connector unit 20A is present. Hence, the cross-sectional area of structures within that region is smaller compared to the region A. Further, the more the connector group 23 of the connector unit 20 is located toward the leading-end side, the fewer the number of connector units 20 there will be in the region occupied by the connector group 23 of that connector unit 20, and thus, the smaller the cross-sectional area of structures within that region will be. For example, when comparing the region occupied by the connector group 23 of the second connector unit 20B and the region E occupied by the connector group 23 of the fifth connector unit 20E, the cross-sectional area of structures within the region E, which is occupied by the connector group 23 of the fifth connector unit 20E, is smaller.

So, in one or more embodiments, as illustrated in FIG. 8, for connector units 20 whose connector group 23 is arranged on the leading-end side, the second tubes 22 of other connector units 20 are permitted to be present in the region occupied by the connector group 23 of the connector unit 20 concerned. For example, the second tubes 22 of the sixth connector unit 20F (i.e., the connector unit 20 that is next longer than the fifth connector unit 20E) are present in the region E occupied by the connector group 23 of the fifth connector unit 20E. With this configuration, in one or more embodiments, the distance in the length direction between the connector group 23 of the fifth connector unit 20E and the connector group 23 of the sixth connector unit 20F can be reduced. As a result, in one or more embodiments, the length L0 of the housing body 51 can be shortened.

Similarly, in relation to one of the connector units 20 (e.g., any one of the sixth connector unit 20F to the eighth connector unit 20H) whose connector group 23 is located on the leading-end side with respect to the connector group 23 of the fifth connector unit 20E, the second tubes 22 of another of the connector units 20 (e.g., the seventh connector unit 20G) are present in a region occupied by the connector group 23 of the one connector unit 20 (e.g., the sixth connector unit 20F, or overlap the connector group 23 of the one connector unit 20). With this configuration, it is possible to reduce also the distance in the length direction between the connector groups 23 which are arranged on the leading-end side with respect to the connector group 23 of the fifth connector unit 20E, and thus, the length L0 of the housing body 51 can be shortened.

Figure 10:
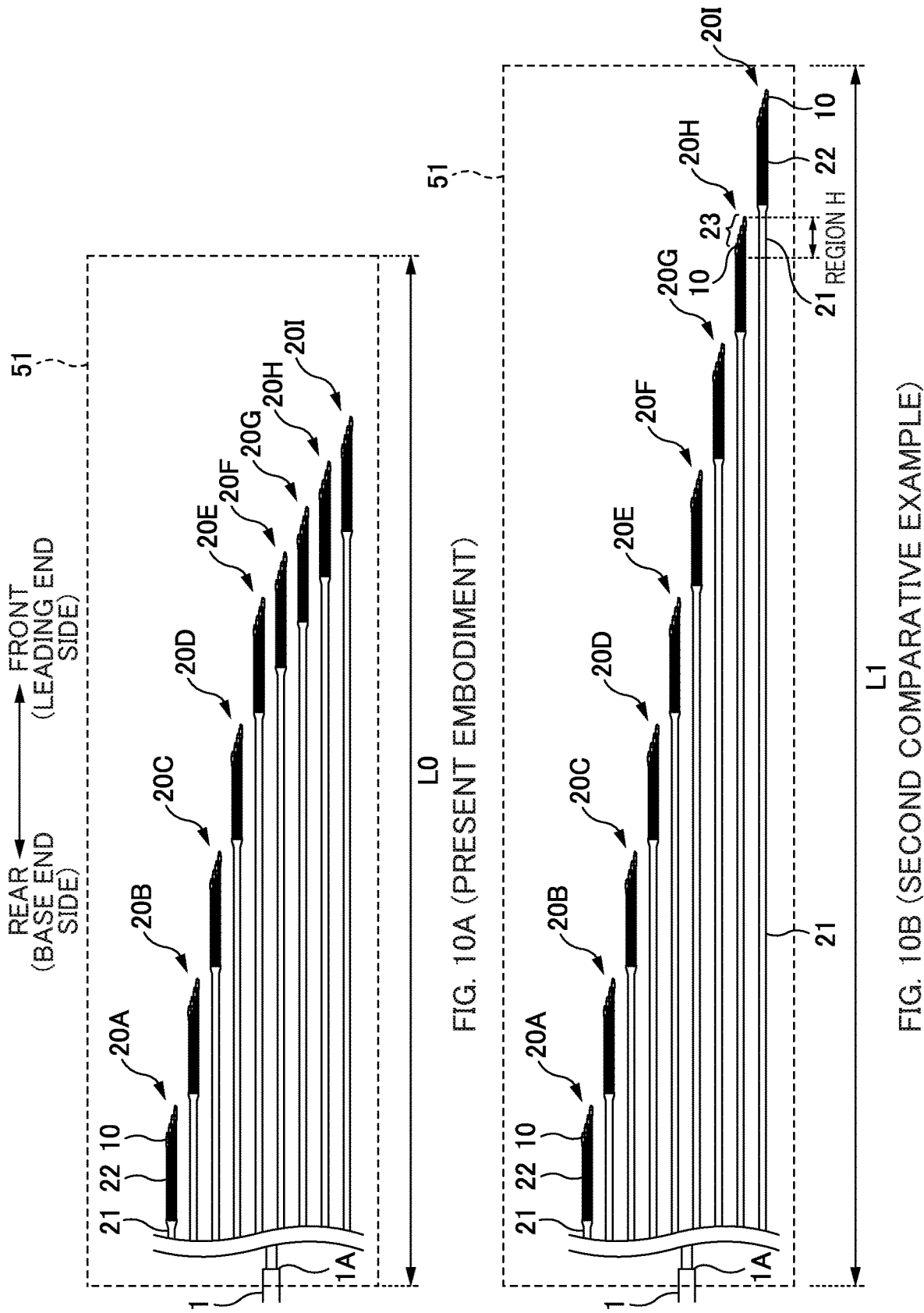
FIGS. 10A and 10B are diagrams for comparing arrangements of connector groups 23.

FIGS. 10A and 10B are diagrams for comparing arrangements of connector groups 23. FIG. 10A illustrates an arrangement of connector groups 23 according to one or more embodiments. FIG. 10B illustrates an arrangement of connector groups 23 according to a second comparative example.

In the second comparative example illustrated in FIG. 10B, for all of the connector units 20, the second tubes 22 of other connector units 20 are not present in a region occupied in the length direction by any connector group 23. Stated differently, for all of the connector units 20 except for the longest ninth connector unit 20I, the respective first tubes 21 of the other connector units 20 are present in a region occupied in the length direction by any connector group 23. Hence, in the second comparative example, it is necessary to widen the distance in the length direction between the connector groups 23 for all of the connector units 20. As a result, in the second comparative example, the distance in the length direction between the connector group 23 of the fifth connector unit 20E and the connector group 23 of the sixth connector unit 20F is wider compared to one or more embodiments illustrated in FIG. 10A. Similarly, in the second comparative example, also in relation to a connector unit 20 (e.g., the sixth connector unit 20F) whose connector group 23 is located on the leading-end side with respect to the connector group 23 of the fifth connector unit 20E, the distance in the length direction between the connector group 23 of the connector unit 20 concerned and the connector group 23 of the next longer connector unit 20 is wider compared to one or more embodiments. As a result, the length L1 of the housing body 51 of the second comparative example becomes longer than the length L0 of the housing body 51 of one or more embodiments.

As described above, in the housing structure of one or more embodiments, the respective first tubes 21 of the connector units 20 other than the first connector unit 20A, which is the shortest connector unit, are present in a region A occupied in the length direction by the connector group 23 of the first connector unit 20A. In this way, one or more embodiments can reduce the diameter of the housing body Si. On the other hand, in relation to at least one of the connector units 20 (e.g., the fifth connector unit 20E) whose connector group 23 is located on the leading-end side with respect to the connector group 23 of the first connector unit 20A, the second tubes 22 of the connector unit 20 (e.g., the sixth connector unit 20F) that is next longer than the aforementioned connector unit 20 are present in a region (e.g., region E) occupied in the length direction by the connector group 23 of the aforementioned connector unit 20. In this way, not only the diameter of the housing body 51, but also the length of the housing body 51 can be reduced.

Further, in one or more embodiments, in case where the second tubes 22 of an [N+1]-th connector unit 20 are present in a region occupied in the length direction by the connector group 23 of an N-th connector unit 20 (for example, in case where N=5), the distance in the length direction between the connector group 23 of the N-th connector unit 20 and the connector group 23 of the [N+1]-th connector unit 20 is shorter than the distance in the length direction between the connector group 23 of the first connector unit 20A and the connector group 23 of the second connector unit 20B, where: the N-th connector unit 20 is an arbitrary connector unit 20; and the [N+1]-th connector unit 20 is the connector unit 20 that is next longer than the N-th connector unit 20. In this way, the length L0 of the housing body 51 can be shortened.

Furthermore, in one or more embodiments, in relation to one of the connector units 20 (e.g., the [N+1]-th connector unit 20; the sixth connector unit 20F) whose connector group 23 is located on the leading-end side with respect to the connector group 23 of the N-th connector unit 20 (e.g., N=5; the fifth connector unit 20E), the second tubes 22 of another of the connector units 20 (e.g., the [N+2]-th connector unit 20; the seventh connector unit 20G) are present in a region occupied in the length direction by the connector group 23 of the aforementioned one connector unit. In this way, the distance in the length direction between the connector groups 23 located on the leading-end side with respect to the connector group 23 of the N-th connector unit 20 can also be reduced, and thus, the length L0 of the housing body 51 can be further shortened. Note, however, that it is not necessary to reduce the distance between all of the connector groups 23 located on the leading-end side with respect to the connector group 23 of the N-th connector unit 20.

Figure 11:
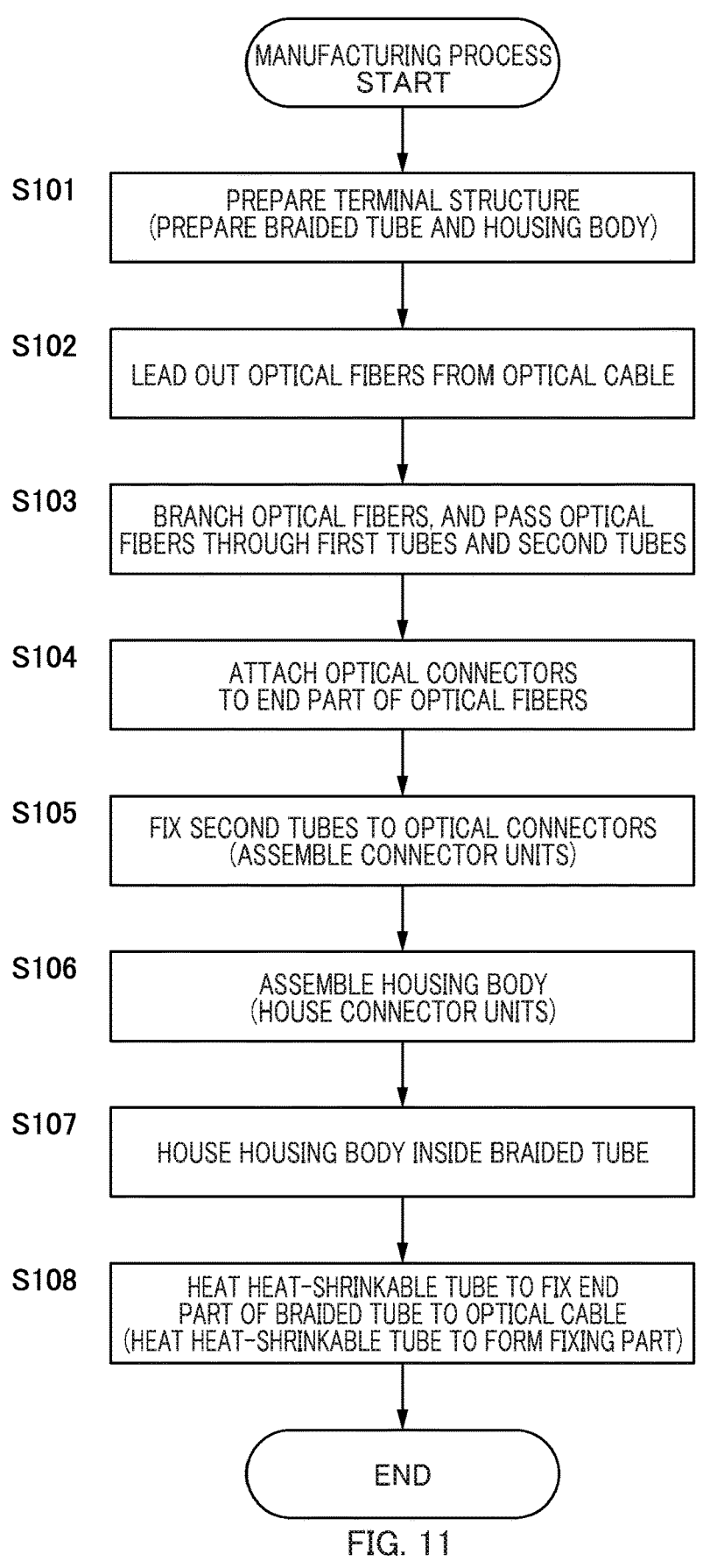
FIG. 11 is a flowchart of a method for manufacturing a pulling-end-equipped optical cable 100 according to one or more embodiments.

Method for Manufacturing Pulling-End-Equipped Optical Cable 100:

FIG. 11 is a flowchart of a method for manufacturing a pulling-end-equipped optical cable 100 according to one or more embodiments. FIGS. 12A to 12F are diagrams illustrating how the pulling-end-equipped optical cable 100 of one or more embodiments is manufactured.

First, a worker prepares the terminal structure 50 of one or more embodiments (S101). More specifically, the worker prepares the aforementioned braided tube 55 and the housing body 51 (e.g., the housing tube 52, the housing tube fixing part, and the front member). Also, the worker prepares a heat-shrinkable tube constituting the tube fixing part 56. Note that the worker passes the optical cable 1 through the heat-shrinkable tube in advance.

Figures 12A, 12B, 12C, 12D, 12E, 12F:
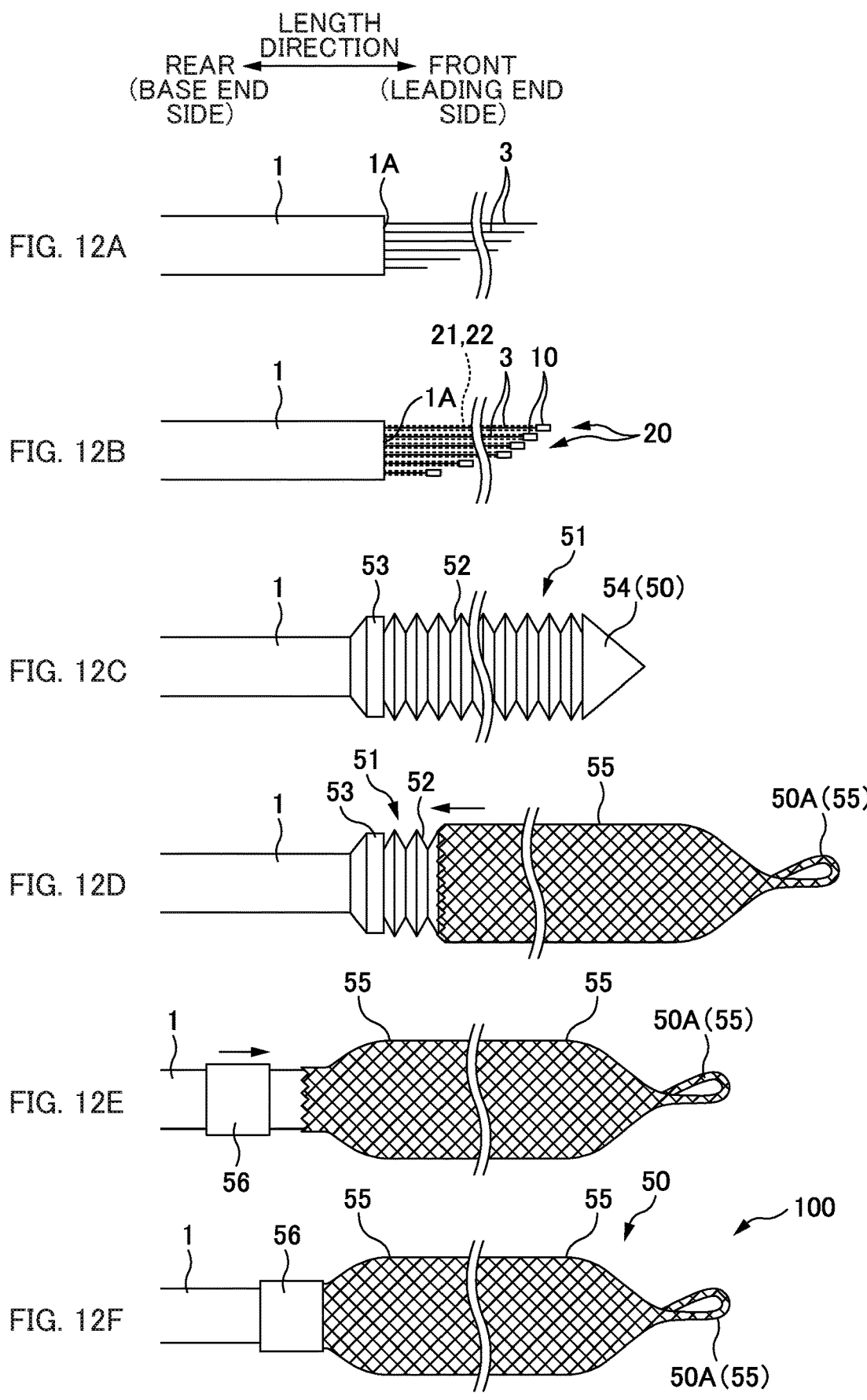
FIGS. 12A to 12F are diagrams illustrating how the pulling-end-equipped optical cable 100 of one or more embodiments is manufactured.

Next, the worker leads out the optical fibers 3 from the optical cable 1 (S102; see FIG. 12A). Further, the worker passes a plurality of optical fibers that have been branched off from the optical cable through the respective first tubes 21, and also passes a plurality of the optical fibers 3 that have been branched off from each first tube 21 through the respective second tubes 22 (S103). Note that the worker cuts the optical fibers 3 (optical fiber ribbons) leading out from the optical cable 1 such that the connector units 20, after completion, respectively have predetermined lengths. Cutting of the optical fibers 3 may be performed before passing the optical fibers through the first tubes 21 and second tubes 22, or after passing the optical fibers through the first tubes 21 and second tubes 22.

Next, the worker attaches the optical connectors 10 to the respective end part of the optical fibers 3 (optical fiber ribbons) passed through the respective second tubes 22 (S104; see FIG. 12B). The worker also fixes the optical connector 10 to the end part of each second tube 22 (S105; see FIGS. 6A to 6C). Note that the worker fixes the opposite-side end part of the second tubes 22 to the respective first tube 21 (not illustrated). By fixing the optical connectors 10 to the respective end parts of all of the second tubes 22, assembly of the plurality of connector units 20 is completed.

Note that, in one or more embodiments, when the plurality of completed connector units 20 are arranged along the length direction, the respective first tubes 21 of the connector units 20 other than the first connector unit 20A, which is the shortest connector unit, are present in a region A occupied in the length direction by the connector group 23 of the first connector unit 20A. Further, in relation to at least one of the connector units 20 (e.g., the fifth connector unit 20E) whose connector group 23 is located on the leading-end side with respect to the connector group 23 of the first connector unit 20A, the second tubes 22 of the connector unit 20 (e.g., the sixth connector unit 20F) that is next longer than the aforementioned connector unit 20 are present in a region (e.g., region E) occupied in the length direction by the connector group 23 of the aforementioned connector unit 20. The worker cuts the optical fibers leading out from the optical cable into predetermined lengths in such a manner that the connector units 20 are arranged as described above (see FIG. 12A).

After assembling the connector units 20, the worker assembles the housing body 51 (S106; see FIG. 12C). In this example, the worker assembles the housing body 51 by attaching the housing tube fixing part to the optical cable, and attaching the housing tube and the front member while housing the connector units 20. Note that, at this stage, the housing structure, wherein the connector units 20 are housed inside the housing body 51 as illustrated in FIG. 8, is completed. Further, in cases where the terminal structure 50 has a structure as illustrated in FIG. 3, manufacture of a pulling-end-equipped optical cable 100 is completed at the stage of S105.

In one or more embodiments, after assembling the housing body 51, the housing body 51 is housed inside the braided tube 55 (S107). At this time, as illustrated in FIG. 12D, the worker slides the braided tube 55 over the housing body 51 from the front side, to arrange the housing tube 52 inside the braided tube 55. Further, as illustrated in FIG. 12E, the worker arranges the end part of the braided tube 55 onto the outer circumference of the optical cable 1 and also slides the heat-shrinkable tube, which has been provided on the optical cable 1 in advance, over the end part of the braided tube 55, to arrange the end part of the braided tube 55 between the optical cable 1 and the heat-shrinkable tube.

Finally, the worker heats the heat-shrinkable tube, to fix the end part of the braided tube 55 to the optical cable 1. In this way, as illustrated in FIG. 12F, manufacturing of the pulling-end-equipped optical cable 100 is completed.

As described above, in the manufacturing method of one or more embodiments: a plurality of optical fibers that branch off from an optical cable are passed through respective first tubes 21; a plurality of the optical fibers that branch off from each first tube 21 are passed through respective second tubes 22; and optical connectors 10 are respectively provided at an end part of the optical fibers that have been passed through the respective second tubes 22 (S103, S104). This thereby creates connector units 20 that branch off from the optical cable and that each include a first tube 21, second tubes 22, and a connector group 23 constituted by the optical connectors 10 provided respectively at an end part of the respective second tubes 22. Further, in one or more embodiments, by housing the connector units 20 in a housing body 51, a housing structure (or pulling-end-equipped optical cable 100) is manufactured. Further, in the manufacturing method of one or more embodiments, the respective first tubes 21 of the connector units 20 other than the first connector unit 20A, which is the shortest connector unit, are present in a region A occupied in the length direction by the connector group 23 of the first connector unit 20A. In this way, one or more embodiments can reduce the diameter of the housing body 51. On the other hand, in relation to at least one of the connector units 20 (e.g., the fifth connector unit 20E) whose connector group 23 is located on the leading-end side with respect to the connector group 23 of the first connector unit 20A, the second tubes 22 of the connector unit 20 (e.g., the sixth connector unit 20F) that is next longer than the aforementioned connector unit 20 are present in a region (e.g., region E) occupied in the length direction by the connector group 23 of the aforementioned connector unit 20. In this way, not only the diameter of the housing body 51, but also the length of the housing body 51 can be reduced.

OTHER EMBODIMENTS

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical cable
1A: Lead-out part
2: Optical fiber unit
3: Optical fiber
4: Outer sheath
5: Wrapping tape
6: Tension member
7: Rip cord
10: Optical connector
11: Ferrule
11A: Guide pin
12: Pin clamp
13: Housing
13A: Engagement hole
14: Coupling
15: Spring
16: Spring pusher
161: Arm part
161A: Claw part
162: Fitting part
17: Fixing member
17A: Fitting part
171: Tubular part
171A: Protrusion part
18: Tubular member
20: Connector unit
21: First tube
22: Second tube
23: Connector group
50: Pulling terminal structure
50A: Pulling part
51: Housing body
52: Housing tube
53: Housing tube fixing part
54: Front member
55: Braided tube
56: Tube fixing part
100: Pulling-end-equipped optical cable

The invention claimed is:
1. A housing structure comprising:
an optical cable comprising optical fibers;

connector units branching off from the optical cable; and
a housing body that houses the connector units, wherein each of the connector units comprises:
a first tube through which the optical fibers pass;
second tubes through each of which the optical fibers branching off from the first tube pass; and
a connector group constituted by optical connectors that are each disposed at an end part of each of the second tubes,
in a length direction, none of the connector groups overlap one another,
an outer diameter of each of the second tubes is smaller than an outer diameter of the first tube,
a total of cross-sectional areas of the second tubes in one of the connector units is larger than a cross-sectional area of the first tube in the one of the connector units,
the connector units are divided into at least a first unit group and a second unit group,
the connector units in the second unit group are all disposed closer to a leading end of the optical cable than any of the connector units in the first unit group,
in the length direction, none of the connector groups of the connector units in the first unit group overlaps the second tubes of any of the other connector units, and
in the length direction, the connector groups of the connector units in the second unit group other than a longest one of the connector units overlaps the second tubes of at least one of the connector units in the second unit group.
2. A pulling-end-equipped optical cable comprising:
an optical cable comprising optical fibers;
connector units branching off from the optical cable; and
a housing body that houses the connector units, wherein each of the connector units comprises:
a first tube through which the optical fibers pass;
second tubes through each of which the optical fibers branching off from the first tube pass; and
a connector group constituted by optical connectors that are each disposed at an end part of each of the second tubes,
in a length direction, none of the connector groups overlap one another,
an outer diameter of each of the second tubes is smaller than an outer diameter of the first tube,
a total of cross-sectional areas of the second tubes in one of the connector units is larger than a cross-sectional area of the first tube in the one of the connector units,
the connector units are divided into at least a first unit group and a second unit group,
the connector units in the second unit group are all disposed closer to a leading end of the pulling-end-equipped optical cable than any of the connector units in the first unit group,
in the length direction, none of the connector groups of the connector units in the first unit group overlaps the second tubes of any of the other connector units, and
in the length direction, the connector group of the connector units in the second unit group other than a longest one of the connector units overlaps the second tubes of at least one of the connector units in the second unit group.
3. The pulling-end-equipped optical cable according to claim 2, further comprising
a braided tube that houses the housing body, wherein
a pulling part is disposed at a first end part of the braided tube, and a second end part of the braided tube that is on an opposite side from the second end part is fixed to the optical cable.

4. A method for manufacturing a housing structure, the method comprising:

creating connector units that:

branch off from an optical cable, and each include:

a first tube;

second tubes; and a connector group constituted by optical connectors that are each disposed at an end part of each of the second tubes, by passing optical fibers that branch off from the optical cable through the first tube, passing the optical fibers that branch off from the first tube through the second tubes, and providing each of the optical connectors at an end part of each of the optical fibers that have been passed through the second tubes; and housing the connector units in a housing body such that the connector units are divided into at least a first unit group and a second unit group, the connector units in the second unit group are all disposed closer to a leading end of the optical cable than any of the connector units in the first unit group, in a length direction, none of the connector groups of the connector units in the first unit group overlaps the second tubes of any of the other connector units, and in the length direction, the connector groups of the connector units in the second unit group other than a longest one of the connector units overlaps the second tubes of at least one of the connector units in the second unit group, wherein an outer diameter of each of the second tubes is smaller than an outer diameter of the first tube, and a total of cross-sectional areas of the second tubes in one of the connector units is larger than a cross-sectional area of the first tube in the one of the connector units.

\* \* \* \* \*